United States Patent Office 3,394,737
Patented July 30, 1968

3,394,737
FLEXIBLE TUBING
Barney G. Hoffmann and Charles H. Will, Jr., San Jose, Calif., assignors to Owens-Corning Fiberglas Corporation, a corporation of Delaware
Filed Nov. 10, 1965, Ser. No. 507,128
5 Claims. (Cl. 138—109)

ABSTRACT OF THE DISCLOSURE

Flexible tubing having a helical coil covered by a flexible covering which includes an inner layer of fabric and an outer layer of sound deadening and heat insulating material covered by a vapor barrier. The flexible covering provides improved sound attenuation, air-flow, and axial tensile strength characteristics.

---

The present invention relates to flexible tubing in general and, in particular, to flexible tubing having an unusually high unitary strength and improved sound insulating qualities.

Today's commercial and residential construction is proceeding at a rapid pace kindling great interest in new materials or products adapted to improve efficiencies of systems being installed as well as to lower the labor costs involved in installation. This is particularly true in the improvement in air conditioning and/or heating systems, whether the installations are in new or already existing structures. The flexible tubing utilized in such systems must be able to convey air at the pressures used over distances usually limited by local building codes. Thus the wall of a tubing must be non-porous, the interior of the tubing must be erosion resistant, the tubing must have good axial tensile strength and strength to resist crushing under forces applied externally.

Accordingly it is an object of this invention to provide a new and improved flexible tubing.

It is another object of this invention to provide a new and improved flexible tubing having the desirable properties discussed hereinbefore, which tubing may be installed quickly and inexpensively and is adapted for manufacture at low cost.

A still further object of this invention is to provide a flexible tubing having a strong unitary but still flexible structure.

A still further object of this invention is to provide a flexible tubing which has greatly enhanced sound deadening capabilities without loss of the unitary structure strength required for many installations.

To attain the above objects there is described herein a flexible tubing comprising a helical coil of wire, connecting members secured to each end of the helical coil, a flexible covering over the coil, and means for securing the flexible covering to the coil. The flexible covering may be a sheet of insulating material and a vapor barrier sheet covering the outer surface of the insulating sheet. By securing the connector members to each end of the helical coil and adhering, for example with an elastomeric adhesive, the sheet of insulating material to the coil a unitary structure is obtained. Mechanical means may then be utilized to secure the connector members at joints which are made, with means such as sheet metal screws, etc., to provide a strength past the usual taping or tape connections that are currently made when flexible tubing is joined to a duct. To further enhance the useability of the flexible tubing just described the flexible covering may be extended past the coil of wire to completely cover the outer surface of one of the connector members and to partially cover the outer surface of the other of the connector members to form in combination therewith female and male connector members, respectively. The insulating material is preferably glass fiber insulation on which the elastomeric or other adhesive may be sprayed in sufficient quantity to secure the sheet to the helical coil assembly, to form a smooth interior film for the tubing, and to lock loose fibers in place on the insulating sheet.

It is advantageous when producing the flexible tubing described hereinbefore to utilize a flexible covering including a first inner layer of woven material in addition to the layer of insulating material which is placed over the woven material and the outer layer of vapor barrier material. The woven material accomplishes two further features in that it adds to the strength of the flexible tubing by providing a good surface for the helical coil to adhere to and further adds to the axial tensile strength of the flexible tubing, particularly when the fabric is woven from threads of high tensile strength. Glass fiber threads are most suitable for this purpose since they have very high tensile strengths, do not corrode or mildew or otherwise deteriorate under the conditions in which they are being used, and are compatible with the preferred type of insulating material so that the woven fabric and the sheet of insulating material may be adhered to each other with binders ordinarily in use in the production of glass fiber mats of insulation.

In addition to the strength characteristics added by the use of a fabric as an inner layer of the flexible covering, it is possible to use less adhesive to adhere the helical coil to the inner layer since the fabric forms a smooth inner film for the tubing in and of itself. Further the use of less adhesive permits openings to remain in the fabric thereby admitting sound to the sound deadening insulation layer from the interior of the tubing thus substantially reducing operational noises normally conducted along such tubings or conduits to the rooms to where the air is being conveyed. Depending upon the installation, of course, it may be desirable to provide a complete coating for the fabric for specific purposes, for example to provide a smooth interior film whenever high air speeds or velocities are involved or to provide a substantially non-porous vapor barrier for the interior of the tubing as well as is provided for the exterior.

Other objects, advantages and features of this invention will become apparent when the following description is taken in conjunction with the accompanying drawings, in which.

Figure 1:
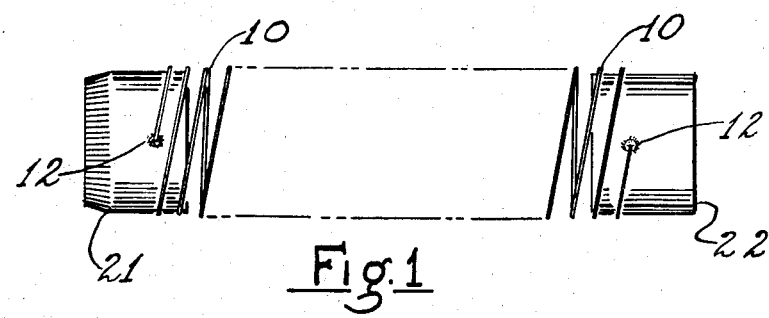
FIGURE 1 illustrates a first step in the production of the flexible tubing of this invention.
Figure 2:
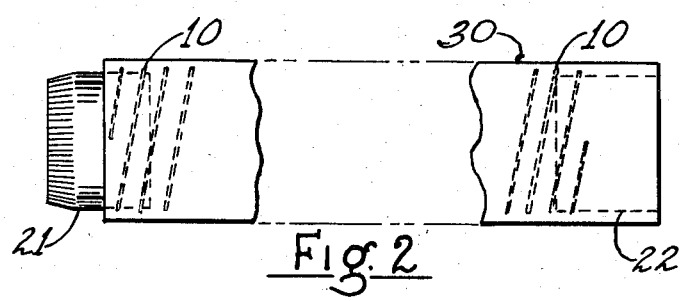
FIGURE 2 illustrates a preferred embodiment of this invention when completed.
Figure 3:
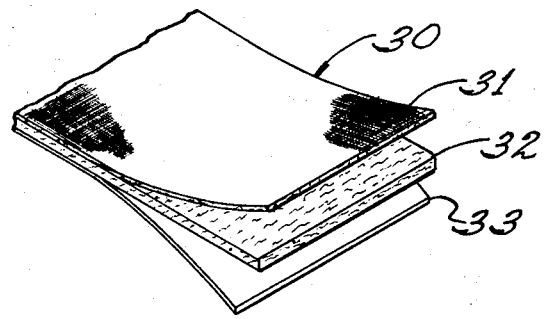
FIGURE 3 is a view in perspective of a flexible covering suitable for use in this invention having various layers peeled away to show the construction thereof.

Referring to FIGURES 1 and 2, there is shown a preferred embodiment of the new tubing. FIGURE 1 illustrates the first step in constructing the new tubing showing a helical coil of corrosive resistant wire 10 as it would appear when wrapped around a mandrel (not shown) to obtain the shape shown in FIGURE 1. A pair of connectors 21, 22 are illustrated as secured to the helical coil 10 at the points 12 by soldering or other suitable means. By securing the connectors 21, 22 to the helical coil 10 in this manner, connections may be made directly to the connectors 21, 22 at specific joints by the use of sheet metal screws or other mechanical fastening means where in the past the connection was generally solely accomplished by the use of tape. It may still be advisable to utilize tape when making the joints in certain applications to prevent air leaks or pressure loss in the system. However, it will be seen that the use of the connectors 21, 22, shown here as stove pipe connectors of the desired diameter, will greatly add to the axial strength of the system when installed. The stove pipe connectors 21, 22 are advantageously nested within the ends of the helical coil 10 for easier attachment to the coil and to prevent interference with the interior of the tubing when joints are made with similar connector members of other pieces of flexible tubing or with other ducts of the system.

Referring to FIGURE 2 there is illustrated the completed product wherein the flexible coil 10 having the connector members 21, 22 secured to the ends thereof, is covered by a flexible covering 30. The high axial strength of the tubing discussed hereinbefore may be attained simply by using a flexible covering 30 having an insulating layer 32 and a vapor barrier layer 33 applied over the helical coil 10, with the insulation layer 32 adjacent the helical coil 10. The inner layer, in this instance insulating material 32, may be adhered to the coil, and preferably also to at least portions of each connector members 21, 22 with an adhesive. The adhesive is preferably of an elastomeric base so that there will be no interference with the flexibility of the tubing. The flexible covering 30 preferably extends past the helical coil 10 to completely cover the outer surface of one of the connector members, for example 22, and to partially cover the outer surface of the other of the connector members 21 to form in combination therewith female and male connector members, respectively. The insulating sheet or layer 32 is preferably comprised of glass fibers which resist deterioration. The elastomeric adhesive may be sprayed on the layer 32 in sufficient quantities to secure the sheet to the helical coil assembly, to form a smooth interior film for the tubing, and to lock loose fibers in place on the interior of the insulating sheet 32.

To enhance the strength properties of the flexible tubing an inner layer 31 of fabric may be used in the flexible covering 30. This fabric is preferably woven from artificial fibers having high tensile strengths, e.g. a glass fiber cloth. The glass fiber or other fabric provides an excellent surface for adhering the helical coil 10 to the flexible covering 30. Further, the amount of adhesive may be reduced so that the openings in the fabric allow the admission of sound from the interior of the tubing to the sound deadening as well as heat insulating layer 32. A layer of fabric, preferably of the glass fiber strength and smoothness prevents the erosion of fibers from the insulating layer 32 and provides a substantially smooth interior for the tubing.

If desired the flexible covering 10 may be pre-assembled to the extent desired to reduce line assembly time when producing the flexible tubing. That is, the fabric layer 31 and the insulating layer 32 may be previously assembled and perhaps compressed before application to the helical coil 10. It may be desirable to add the outer or vapor barrier layer 33 of vinyl or other advantageously scuff resistant material to the two inner layers before assembly to the helical coil 10. However, it may be advantageous to wrap on or apply the two inner layers to the helical coil first in widths equal to substantially the length of the tubing desired, and then apply the vapor barrier layer 33 as a second covering process so that the seams of the layers may be spaced to add to the strength characteristics of the flexible tubing while reducing the chances for air leaks or pressure drops.

It may be seen that, particularly when the cloth or other fabric inner layer 31 is adhered to the helical coil 10 and to the connector portions 21, 22 that a substantially unitary structure is attained while still retaining sufficient flexibility to make a 180° turn with the tubing without collapsing or otherwise reducing the effectiveness of the tubing. If connector members are not desired in a particular application then the utilization of a fabric layer 31 greatly enhances the strength of the flexible tubing while providing a good surface to which the helical coil 10 may be adhered so that one or more of the rounds of coil 10 will not become loose and collapse causing the tubing to lose its usefulness.

In conclusion, it is pointed out that while the illustrative examples constitute practical embodiments of the invention, it is not intended to limit the invention to the exact details shown since modifications may be made without departing from the spirit and scope of the invention disclosed.

We claim:

1. A flexible tubing comprising a helical coil of wire; connector members secured to each end of said helical coil; a flexible covering over said coil; said flexible covering including an inner layer of glass fiber fabric, having openings therein, to add to the axial tensile strength of the tubing and providing a smooth inner surface, a layer of sound deadening and heat insulating material, and an outer layer of vapor barrier material; and means for securing said inner layer to said helical coil to form a strong unitary but flexible structure.

2. A flexible tubing comprising a helical coil of wire; connector members secured to each end of said helical coil; a flexible covering over said coil of wire including a first inner layer of woven glass fiber material, a second layer of insulating material, and an outer layer of vapor barrier material; said flexible covering extending past said coil of wire to completely cover the outer surface of one of said connector members and to partially cover the outer surface of the other of said connector members to form in combination therewith female and male connector members, respectively; and means for adhesively securing said flexible covering to said helical coil and said connector members to form a strong unitary but flexible structure.

3. A flexible tubing comprising a helical coil of wire; stove-pipe type connector members nested within and secured to each end of said helical coil; a flexible covering over said coil including a first inner layer of woven glass fiber material, a second layer of glass fiber insulating material, and an outer layer of vapor barrier material; said flexible covering extending past said coil of wire to completely cover the outer surface of one of said connector members and to partially cover the outer surface of the other of said connector members to form in combination therewith female and male connector members, respectively; and elastomeric adhesive means sprayed on the inner surface of said inner layer in sufficient quantities to secure said inner layer to said helical coil assembly, to form a smooth interior film for the tubing, and to provide a unitary but flexible structure.

4. A flexible tubing comprising a helical coil of wire; connector means secured to each end of said helical coil; a flexible covering over said coil including an inner layer of fabric having threads with high tensile strengths and openings in said fabric, and an outer layer including sound deadening and heat insulating and vapor barrier means; and means for securing said flexible covering to said coil and connector means to form a unitary flexible structure.

5. A flexible tubing comprising a helical coil of wire, a flexible covering over said coil including an inner layer of fabric having openings therein, said fabric adding axial tensile strength to said tubing and providing a smooth inner surface for the passage of air, an adhesive material between said inner layer of fabric and said coil, and an outer layer adhered to said inner layer of fabric, said outer layer having sound deadening and heat insulating means and vapor barrier means, said adhesive material securing said inner layer of fabric to said coil.

(References on following page)

References Cited

UNITED STATES PATENTS

| | | | |
|---|---|---|---|
| 1,009,465 | 11/1911 | Bowers | 138—131 |
| 2,858,854 | 11/1958 | Daggett | 138—131 X |
| 2,980,144 | 4/1961 | Edwards et al. | 138—131 X |
| 3,216,459 | 11/1965 | Schroeder et al. | 138—131 X |

FOREIGN PATENTS 56,640    8/1939    Denmark.

LAVERNE D. GEIGER, *Primary Examiner.*

C. L. HOUCK, *Assistant Examiner.*